(12) United States Patent
Price et al.

(10) Patent No.: US 10,574,909 B2
(45) Date of Patent: Feb. 25, 2020

(54) HYBRID IMAGING SENSOR FOR STRUCTURED LIGHT OBJECT CAPTURE

(71) Applicant: Microsoft Technology Licensing, LLC, Redmond, WA (US)

(72) Inventors: Raymond Kirk Price, Redmond, WA (US); Michael Bleyer, Seattle, WA (US); Jian Zhao, Kenmore, WA (US); Denis Demandolx, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 540 days.

(21) Appl. No.: 15/231,179

(22) Filed: Aug. 8, 2016

(65) Prior Publication Data

US 2018/0041718 A1 Feb. 8, 2018

(51) Int. Cl.
| | |
|---|---|
| *H04N 5/33* | (2006.01) |
| *H04N 13/257* | (2018.01) |
| *H04N 13/254* | (2018.01) |
| *G01S 7/4912* | (2020.01) |
| *G01S 17/46* | (2006.01) |

(Continued)

(52) U.S. Cl.
CPC ........... *H04N 5/332* (2013.01); *G01S 7/4816* (2013.01); *G01S 7/4863* (2013.01); *G01S 7/4868* (2013.01); *G01S 7/4914* (2013.01); *G01S 7/4918* (2013.01); *G01S 17/46* (2013.01); *G01S 17/89* (2013.01);
(Continued)

(58) Field of Classification Search
CPC .... H04N 5/332; H04N 13/257; H04N 13/254; G01S 7/4914; G01S 7/4868; G01S 7/4863; G01S 7/4816; G01S 17/46; G01S 7/4918; G01S 17/89
See application file for complete search history.

(56) References Cited

U.S. PATENT DOCUMENTS 5,724,152 A 3/1998 Hayashi et al.
7,375,803 B1 5/2008 Bamji
(Continued)

FOREIGN PATENT DOCUMENTS

WO 2014010251 A1 1/2014

OTHER PUBLICATIONS

Zhang, Zhengyou, "Microsoft Kinect Sensor and Its Effect", In Proceedings of IEEE Multimedia, vol. 19, Issue 2, Feb. 2012, pp. 1-7.

(Continued)

*Primary Examiner* — Joseph W Becker
(74) *Attorney, Agent, or Firm* — Ray Quinney & Nebeker, P.C.; John Carpenter; William C. Hwang

(57) ABSTRACT

A three dimensional imaging system includes a hybrid imaging sensor with infrared wavelength photoreceptors and visible wavelength photoreceptors integrated in one photoreceptor array. The three dimensional imaging system includes a bandpass filter to filter incoming light before the light is received at the hybrid imaging sensor to reduce crosstalk between the infrared wavelength photoreceptors and visible wavelength photoreceptors. The infrared photoreceptors receive infrared light provided by a structured light source and the visible wavelength photoreceptors receive ambient visible light. The hybrid imaging sensor collects infrared image data and visible light image data concurrently and/or simultaneously.

19 Claims, 5 Drawing Sheets

(51) Int. Cl.
*G01S 17/89* (2020.01)
*G01S 7/481* (2006.01)
*G01S 7/4863* (2020.01)
*G01S 7/486* (2020.01)
*G01S 7/4914* (2020.01)

(52) U.S. Cl.
CPC ......... *H04N 13/254* (2018.05); *H04N 13/257* (2018.05)

(56) References Cited

U.S. PATENT DOCUMENTS

| | | |
|---|---|---|
| 7,915,652 B2 | 3/2011 | Lee et al. |
| 8,274,051 B1 | 9/2012 | Aswell et al. |
| 8,681,216 B2 | 3/2014 | Atkinson |
| 8,767,074 B2 | 7/2014 | Kim et al. |
| 9,083,960 B2 | 7/2015 | Wagner et al. |
| 9,171,361 B2 | 10/2015 | Strandemar |
| 9,245,196 B2 | 1/2016 | Marks et al. |
| 9,251,623 B2 | 2/2016 | Kirk |
| 9,264,610 B2 | 2/2016 | Duparre |
| 2003/0063185 A1 | 4/2003 | Bell |
| 2004/0169749 A1 | 9/2004 | Acharya |
| 2007/0146512 A1 | 6/2007 | Suzuki et al. |
| 2007/0183657 A1 | 8/2007 | Kidono et al. |
| 2007/0189583 A1 | 8/2007 | Shimada et al. |
| 2008/0106746 A1 | 5/2008 | Shpunt et al. |
| 2009/0079834 A1 | 3/2009 | Otsu |
| 2010/0289885 A1 | 11/2010 | Lu et al. |
| 2010/0290698 A1 | 11/2010 | Freedman et al. |
| 2010/0321770 A1 | 12/2010 | Pyo et al. |
| 2012/0056982 A1 | 3/2012 | Katz et al. |
| 2013/0215235 A1 | 8/2013 | Russell |
| 2013/0226344 A1* | 8/2013 | Wong ................... G05D 1/024 700/258 |
| 2013/0258112 A1 | 10/2013 | Baksht |
| 2013/0307932 A1 | 11/2013 | Mestha et al. |
| 2013/0321589 A1 | 12/2013 | Kirk et al. |
| 2014/0049812 A1 | 2/2014 | Palanchoke et al. |
| 2014/0055560 A1 | 2/2014 | Fu et al. |
| 2014/0184808 A1* | 7/2014 | Ryoki ............... H01L 27/14621 348/164 |
| 2014/0240492 A1 | 8/2014 | Lee |
| 2014/0300589 A1 | 10/2014 | Tanaka et al. |
| 2015/0063681 A1 | 3/2015 | Bhardwaj et al. |
| 2015/0130908 A1 | 5/2015 | Kang et al. |
| 2015/0138366 A1 | 5/2015 | Keelan et al. |
| 2015/0181187 A1 | 6/2015 | Wu et al. |
| 2015/0312537 A1 | 10/2015 | Solhusvik et al. |
| 2015/0350618 A1 | 12/2015 | Meier et al. |
| 2016/0057367 A1 | 2/2016 | Lee |
| 2016/0063309 A1 | 3/2016 | Konolige et al. |
| 2016/0080706 A1 | 3/2016 | Kaiser et al. |
| 2016/0165214 A1 | 6/2016 | Kim |
| 2016/0261300 A1 | 9/2016 | Fei et al. |
| 2016/0317004 A1* | 11/2016 | Yoshizaki .............. H04N 5/332 |
| 2017/0105020 A1 | 4/2017 | Wajs et al. |
| 2017/0118418 A1 | 4/2017 | Wang et al. |
| 2017/0150071 A1 | 5/2017 | Otsubo et al. |
| 2017/0263662 A1 | 9/2017 | Hsieh et al. |
| 2017/0272726 A1 | 9/2017 | Ovsiannikov |
| 2017/0366762 A1 | 12/2017 | Hicks et al. |
| 2018/0164156 A1 | 6/2018 | Price et al. |

OTHER PUBLICATIONS

"International Search Report and Written Opinion Issued in PCT Application No. PCT/US2017/044272", dated Nov. 13, 2017, 13 Pages.

"Frequently Asked Questions", Retrieved From: https://www.e-consystems.com/OV4682-4MP-MIPI-IR-camera-module-faq.asp, Aug. 25, 2016, 7 Pages.

"Non Final Office Action Issued in U.S. Appl. No. 15/375,200", dated Apr. 10, 2018, 16 Pages.

"Olympus Shows a New 'Hybrid' RGB-IR Sensor", Retrieved From: https://web.archive.org/web/20160610113008/http://www.43rumors.com/olympus-presents-new-olympus-rgb-ir-sensor/, Jun. 7, 2016, 29 Pages.

"OV4682 RGB IR Color CMOS 4-megapixel (2688x1520) Image Sensor with OmniBSI-2" Technology", Retrieved From: https://web.archive.org/web/20170302044415/http://www.ovt.com/products/sensor.php?id=145, Nov. 5, 2016, 2 Pages.

"Time of Flight: Samsung's New RGB Image Sensor Also Has Depth Sight", Retrieved From: https://web.archive.org/web/20120308204152/http://www.embedded-vision.com/news/2012/03/01/time-flight-samsungs-new-rgb-image-sensor-also-has-depth-sight, Mar. 1, 2012, 1 Page.

Alhwarin, et al., "IR Stereo Kinect: Improving Depth Images by Combining Structured Light with IR Stereo", In Proceedings of 13th Pacific Rim International Conference on Artificial Intelligence, Dec. 1, 2014, 9 Pages.

Izadi, et al., "KinectFusion: Real-time 3D Reconstruction and Interaction Using a Moving Depth Camera", In Proceedings of the 24th Annual ACM Symposium on User Interface Software and Technology, Oct. 16, 2011, pp. 559-568.

Keller, et al., "Real-time 3D Reconstruction in Dynamic Scenes using Point-based Fusion", In Proceedings of the 2013 International Conference on 3D Vision, Jun. 29, 2013, 8 Pages.

Liszewski, Andrew, "New Camera Sensor Captures Images and Depth Data At the Same Time", Retrieved From: https://web.archive.org/web/20120301183251/http://gizmodo.com/5889363/new-camera-sensor-captures-images-and-depth-data-at-the-same-time, Feb. 29, 2012, 2 Pages.

Tang, et al., "High Resolution Photography with an RGB-Infrared Camera", In Proceedings of IEEE International Conference on Computational Photography, Apr. 24, 2015, 10 Pages.

"Final Office Action Issued in U.S. Appl. No. 15/375,200", dated Oct. 12, 2018, 19 Pages.

* cited by examiner

HYBRID IMAGING SENSOR FOR STRUCTURED LIGHT OBJECT CAPTURE

CROSS-REFERENCE TO RELATED APPLICATIONS

N/A

BACKGROUND

Background and Relevant Art

Three-dimensional (3D) imaging systems are commonly used in conjunction with a visible light imaging system to provide depth information related to pixels of a visible image (commonly a color image). The depth information is conventionally collected using a time-of-flight imaging system or structured light imaging system that utilizes infrared light to calculate distances.

The infrared light is conventionally emitted from the 3D imaging system and detected using a one or more infrared photoreceptors in an infrared imaging sensor. A 3D imaging system with both an infrared imaging sensor and a visible light imaging sensor may experience perspective shifts between the infrared imaging sensor and the visible light imaging sensor due to the physical displacement between the sensors.

The physical displacement results in misalignment of depth data with visible image data as objects or surfaces may be occluded respectively one of the imaging sensors or the other. Additionally, conventional 3D imaging systems alternate frame captures between the infrared wavelength photoreceptors and the visible light photoreceptors to reduce crosstalk between the visible wavelength photoreceptors and the infrared wavelength photoreceptors.

However, alternating frame captures introduce an additional temporal displacement to the visible image data and the infrared image data (i.e., the depth data). This can be particularly problematic when the 3D imaging system and/or target being imaged are moving. For example, the temporal displacement results in incorrect depth data or invalidation of the depth data with respect to the visible image data during movement of the 3D imaging system and/or the target during the imaging.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

In some disclosed embodiments, a system of three-dimensional imaging is configured with a structured light source, a hybrid imaging sensor, and a bandpass filter. The structured light source emits light in a structured illumination pattern. The emitted light is emitted with a peak infrared wavelength between about 750 nm and about 1000 nm.

The hybrid imaging sensor is configured with a plurality of domains. At least one of the domains includes at least one visible wavelength photoreceptor and at least one infrared wavelength photoreceptor. The visible wavelength photoreceptor detects ambient light in the visible wavelength range. The infrared wavelength photoreceptor detects infrared light in the infrared wavelength range, where the hybrid imaging sensor detects a portion of the emitted light as a reflected light. The bandpass filter passes light in the visible wavelength range and in the infrared wavelength range.

In some embodiments, the system of three-dimensional imaging is further configured with one or more processors in data communication with the hybrid imaging sensor and which are configured to execute stored computer-executable instructions for controlling the hybrid imaging sensor and/or related components of the system.

Disclosed embodiments also include methods for performing three-dimensional imaging with the disclosed systems. These methods include receiving incoming light with the imaging system, wherein the incoming light includes visible light, infrared ambient light, and infrared light reflected from the infrared illuminator. The methods also include filtering the incoming light to attenuate light at least between about 650 nm and about 750 nm and collecting visible image data regarding the visible light with at least one visible wavelength photoreceptor and infrared image data regarding the infrared light with at least one infrared wavelength photoreceptor concurrently.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which.

DETAILED DESCRIPTION

This disclosure generally relates to devices, systems, and methods for three-dimensional (3D) imaging. More particularly, the present disclosure relates to 3D imaging using simultaneous collection of infrared and visible wavelength image data in a frame. The present disclosure relates to the production of a structured light pattern and receipt, filtering, and collection of a reflected light pattern and ambient visible wavelength light to refine 3D imaging of an environment or object.

In some embodiments, a 3D imaging system according to the present disclosure includes a structured light source that is configured to provide an emitted light in a structured light pattern. The structured light source may emit light in a narrow band in the infrared range about a peak wavelength. The 3D imaging system may further include a hybrid imaging sensor to collect incoming light within the visible wavelength range and in the infrared range at and/or near the peak wavelength of the emitted light.

The hybrid imaging sensor includes, in some embodiments, a bandpass filter to attenuate light outside of the visible wavelength range and in the infrared range at and/or near the peak wavelength of the emitted light. For example, the hybrid imaging sensor may include an array of photoreceptors, at least some of which may have different spectral response curves. At least some of the photoreceptors may have a spectral response curve exhibiting sensitivity to light outside of the visible wavelength range and in the infrared range at and/or near the peak wavelength of the emitted light. The bandpass filter may pass light in the visible wavelength range and in the infrared range at and/or near the peak wavelength of the emitted light, while attenuating the light outside the visible wavelength range and in the infrared range at and/or near the peak wavelength of the emitted light to differentiate the image data at each photoreceptor and reduce crosstalk in the image data.

Figure 1:
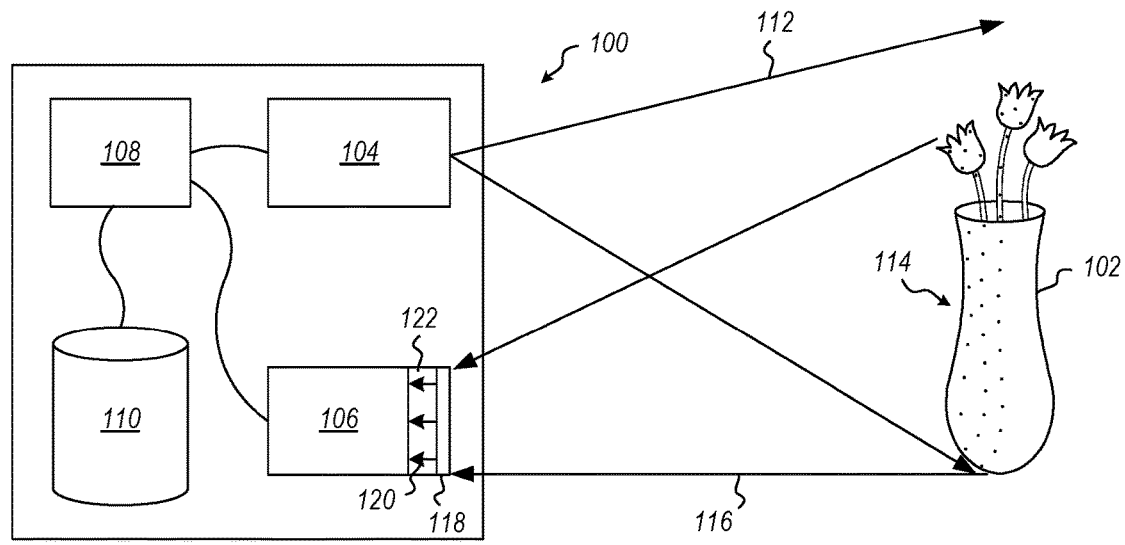
FIG. 1 is a schematic representation of an embodiment of a 3D imaging system, which includes a hybrid imaging sensor and a bandpass filter.

FIG. 1 illustrates a schematic representation of a 3D imaging system 100 imaging an object 102. The 3D imaging system 100 includes a structured light source 104 and a hybrid imaging sensor 106. The structured light source 104 and the hybrid imaging sensor 106 are in data communication with one or more hardware processors 108 configured to control and/or coordinate data flow and operation of the structured light source 104 and the hybrid imaging sensor 106. In some embodiments, the one or more processors 108 may be a single processor that receives and sends information and commands to both the structured light source 104 and the hybrid imaging sensor 106, as shown in FIG. 1. In other embodiments, the one or more processors 108 may be a plurality of processors, such as individual processors or controllers configured to control and/or coordinate one of the structured light source 104 or the hybrid imaging sensor 106.

The 3D imaging system 100 includes at least one storage device 110 in data communication with the one or more processors 108. The storage device 110 may store thereon one or more instructions that, when performed by the one or more processors 110, perform at least one of the methods described herein.

The 3D imaging system 100 is configured to image an object 102 or environment around the 3D imaging system 100. The 3D imaging system 100 images targets/objects, such as object 102, by emitting an emitted light 112 from the structured light source 104. In some embodiments, the emitted light 112 is a continuous wave light. In other embodiments, the emitted light 112 is a pulsed and the receiving IR pixels are coordinated with the IR emitted light pulses.

In some embodiments, the emitted light 112 from the structured light source 104 is emitted within an infrared wavelength range centered around a peak wavelength within a range between about 750 nm and about 1000 nm. In some embodiments, the emitted infrared wavelength range has a spectral full width half maximum width less than about 75 nanometers (nm), 70 nm, 65 nm, 60 nm, 50 nm, 45 nm, 40 nm, 35 nm, 30 nm, 25 nm, 20 nm, 15 nm, 10 nm, 5 nm, 1 nm, 0.1 nm or any values therebetween. For example, the emitted light 112 may have a peak wavelength between 800 and 875 nm, and a spectral full width half maximum of 0.1 to 10 nm. In other examples, the emitted light 112 may be within an emitted infrared wavelength range from 850 nm to 900 nm. In yet other examples, the emitted light 112 may be within an emitted infrared wavelength range from 825 nm to 860 nm.

In some embodiments, the emitted light 112 is emitted in a structured light pattern 114, such as the grid of nodes shown in FIG. 1. The emitted light 112 is reflected from the object 102 or other elements in the surrounding environment. The reflected emitted light and ambient light may combine into the incoming light 116 that is received by the hybrid imaging sensor 106. The hybrid imaging sensor 106 is capable of detecting both the infrared light of the reflected emitted light and the visible wavelength light of the ambient light of the incoming light 116.

The hybrid imaging sensor 106 and the structured light source 104 may be displaced from one another. For example, there may be a disparity in the position of the structured light source 104 and hybrid imaging sensor 106 relative to the object 102 being imaged.

In some embodiments, the hybrid imaging sensor 106 has a bandpass filter 118 that attenuates at least a portion of the incoming infrared light around the illuminator spectral range 116 to produce a filtered light 120. The filtered light 120 is then detected and captured by a photosensor array 122 that includes both visible wavelength photoreceptors and infrared photoreceptors.

Figure 2:
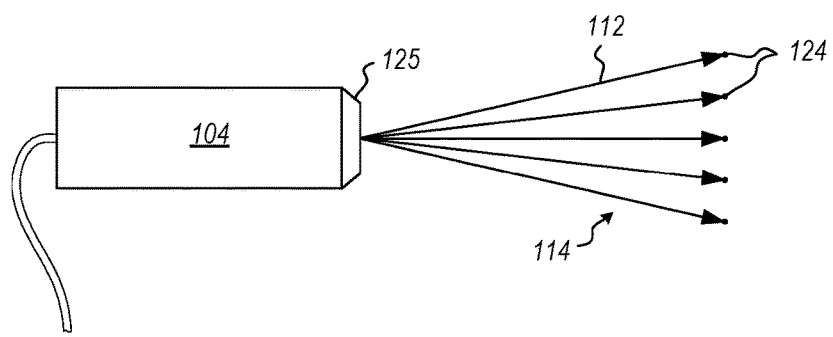
FIG. 2 is a schematic representation of an embodiment of the light source of FIG. 1.

FIG. 2 illustrates an embodiment of the structured light source 104 of FIG. 1. The structured light source 104 may be a coherent light source or a non-coherent light source that is configured to emit an emitted light 112 in a structured light pattern 114 with a plurality of dots 124. The dots 124 are interference nodes where the emitted light 112 is at or near a maximum intensity. For example, the structured light source 104 may be a coherent light source that passes through a diffraction grating 125 to diffract the emitted light 112 in a diffraction pattern. The diffraction pattern is a consistent structured light pattern 114 that may provide a reference against which any deviations of dot locations may be compared. The dot pattern or another substitute pattern can also be modulated.

Figure 3A:
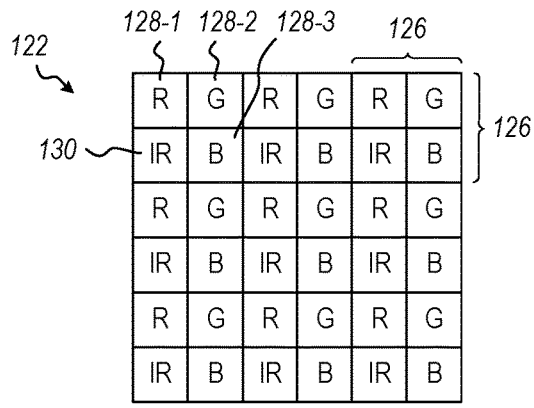
FIG. 3A is a schematic representation of an embodiment of the hybrid imaging sensor of FIG. 1.
Figure 3B:
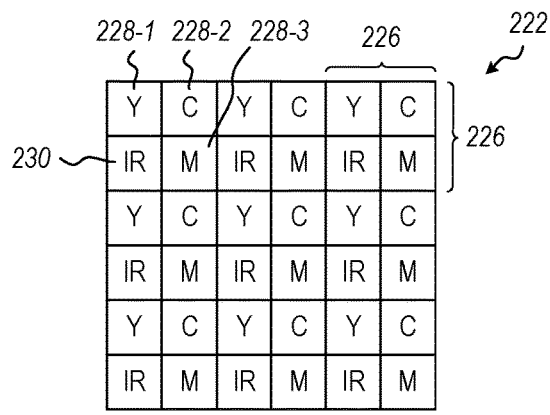
FIG. 3B is a schematic representation of another embodiment of the hybrid imaging sensor of FIG. 1.

FIGS. 3A and 3B illustrate embodiments of a photoreceptor array of a hybrid imaging sensor. For example, FIG. 3A is a plan view of the embodiment of a photoreceptor array 122 of the hybrid imaging sensor 106 of FIG. 1. The photoreceptor array 122 may have a plurality of domains 126 where each domain 126 includes a plurality of photoreceptors. In some embodiments, a domain 126 includes at least one visible wavelength photoreceptor and at least one infrared wavelength photoreceptor. In the embodiment shown in FIG. 3A, the domain 126 includes a first visible wavelength photoreceptor 128-1 configured to detected red light, a second visible wavelength photoreceptor 128-2 configured to detect blue light, and a third visible wavelength photoreceptor 128-3 configured to detect green light. The domain 126 also includes an infrared wavelength photoreceptor 130 configured to detect light in the infrared range.

In other embodiments, the photoreceptor array is configured to detect other types of visible wavelength light. FIG. 3B illustrates another embodiment of a photoreceptor array 222, for example, which is configured to detect yellow, cyan, and magenta light. The corresponding domain 226 includes a first visible wavelength photoreceptor 228-1 that is configured to detected yellow light, a second visible wavelength photoreceptor 228-2 configured to detect cyan light, and a third visible wavelength photoreceptor 228-3 configured to detect magenta light. The domain 226 also includes an infrared wavelength photoreceptor 230 configured to detect light in the infrared range.

In other embodiments, the visible wavelength photoreceptors are configured to detect other wavelength ranges that, when combined, substantially cover the visible wavelengths within the range of about 375 nm to about 650 nm.

Figure 4:
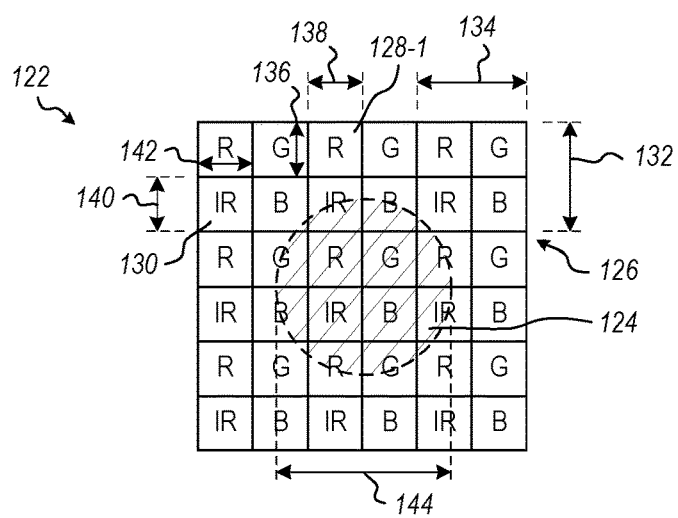
FIG. 4 illustrates the embodiment of the hybrid imaging sensor of FIG. 3A receiving a dot of infrared light.

The area of the photoreceptor(s) and/or domain(s) are at least partially related to an area of the aforementioned dot(s) in the structured light pattern. As shown in FIG. 4, the photoreceptor array 122 includes domains 126 with a domain height 132 and a domain width 134. In embodiments with a domain 126 having orthogonal sides, the domain area is the product of the domain height 132 and domain width 134. Within a single domain 126, a total area of the visible wavelength photoreceptors and the infrared photoreceptors may be the domain area. For example, the first visible wavelength photoreceptor 128-1 has a visible wavelength photoreceptor height 136 and a visible wavelength photoreceptor width 138 that defines the area of the first visible wavelength photoreceptor 128-1. The infrared photoreceptor 130 may have an infrared photoreceptor height 140 and an infrared photoreceptor width 142 that defines the area of the infrared photoreceptor 130.

In some embodiments, the area of the infrared photoreceptor 130 is equal to or about 25% of the domain area. In other embodiments, the area of the infrared photoreceptor 130 is greater than 25% of the domain area. In yet other embodiments, the area of the infrared photoreceptor 130 is less than 25% of the domain area. In some embodiments, the remaining portion of the domain area are equally divided amongst the plurality of visible wavelength photoreceptors. For example, in the embodiment depicted in FIG. 4, the first visible wavelength photoreceptor 128-1 has an area that is about 25% of the domain area. In other embodiments, the visible wavelength photoreceptors have differing areas with a single domain 126. In yet other embodiments, areas of the first visible wavelength photoreceptor 128-1, second visible wavelength photoreceptor 128-2, and third visible wavelength photoreceptor 128-3, respectively, may be balanced to alter and/or optimize the color accuracy of the imaged visible light.

In some embodiments, at least one of the visible wavelength photoreceptors (such as the first visible wavelength photoreceptor 128-1) has an area approximately equal to the area of the infrared photoreceptor 130. In other embodiments, at least one of the visible wavelength photoreceptors (such as the first visible wavelength photoreceptor 128-1) has an area that is greater than the area of the infrared photoreceptor 130. In yet other embodiments, at least one of the visible wavelength photoreceptors (such as the first visible wavelength photoreceptor 128-1) has an area that is less than the area of the infrared photoreceptor 130.

In some embodiments, the total area of the infrared photoreceptors 130 of the photoreceptor array 122 is equal to or about 25% of the total area of the photoreceptor array 122. In other embodiments, the total area of the infrared photoreceptors 130 of the photoreceptor array 122 is greater than 25% of the total area of the photoreceptor array 122. In yet other embodiments, the total area of the infrared photoreceptors 130 is less than 25% of the total area of the photoreceptor array 122.

3D imaging of an object, such as object 102 in FIG. 1, may be at least partially dependent upon the spatial resolution to which the location of the constituent portions of the structured light pattern may be detected by the infrared photoreceptors of a hybrid imaging sensor. To accurately measure the position and/or deflection of a dot in a structured light pattern, the infrared light from the dot may be detected by (i.e., impinged upon) at least three of the infrared photoreceptors.

As shown in FIG. 4, a dot 124 of the filtered light (such as filtered light 120 in FIG. 1) may have a dot diameter 144. In some embodiments, the horizontal spacing of the infrared photoreceptors 130 is at least partially dependent upon the domain width 134 and the vertical spacing of the infrared photoreceptors 130 is at least partially dependent upon the domain height 132. For example, to ensure at least three of the infrared photoreceptors 130, the domain height 132 and domain width 134 may be no more than 50% of the dot diameter 144. In such an example, if a dot 124 is centered on an infrared photoreceptor 130 at least one of the other infrared photoreceptors 130 will receive at least a portion of the infrared light of the dot 124. In other embodiments, the domain height 132 and domain width 134 is less than about 40% of the dot diameter 144. In yet other embodiments, the domain height 132 and domain width 134 less than about 33% of the dot diameter 144.

In some embodiments, the hybrid imaging sensor is an 1080p hybrid imaging sensor having a 70°×40° viewing angle and a resolution of 1920 photoreceptors (i.e., pixels) in the horizontal direction and 1080 photoreceptors in the vertical direction. A hybrid imaging sensor according to this example will include 540 domains in the vertical direction and 540 infrared wavelength photoreceptors in the vertical direction, and 960 domains in the horizontal direction, with 960 infrared wavelength photoreceptors in the horizontal direction.

The resolution (mrad/pixel) of the collective array of infrared wavelength photoreceptors 130 ("IR resolution") are preferably within a range of about 1.0 mrad/pixel and 1.6 mrad/pixel (e.g., 1.0 mrad/pixel, 1.1 mrad/pixel, 1.2 mrad/pixel, 1.3 mrad/pixel, 1.4 mrad/pixel, 1.5 mrad/pixel, 1.6 mrad/pixel, or any values therebetween). In some examples, the IR resolution is between about 1.2 mrad/pixel and about 1.4 mrad/pixel. In at least one example, the IR resolution is about 1.27 mrad/pixel.

In some embodiments, the dot diameter 144 is at least partially related to the divergence of the emitted light and/or structured light pattern. For example, the dot diameter 144 may be at least partially dependent on the beam divergence of the emitted light. The dot divergence may be in a range having an upper value, a lower value, or upper and lower values including any of about 3.5 milliradians (mrad), 3.6 mrad, 3.7 mrad, 3.8 mrad, 3.9 mrad, 4.0 mrad, 4.1 mrad, 4.2 mrad, or any values therebetween. For example, the dot divergence may be greater than 3.5 mrad. In another example, the dot divergence is less than about 4.2 mrad. In yet another example, the dot divergence is between about 3.5 mrad and about 4.2 mrad. In further examples, the dot divergence is between about 3.7 and about 4.0 mrad. In yet further examples, the dot divergence is between about 3.8 and about 3.9 mrad. In at least one example, the dot divergence is about 3.818 mrad.

A bandpass filter (such as bandpass filter 118 in FIG. 1) may attenuate at least a portion of the incoming infrared ambient light and transmit or pass at least another portion of the incoming light corresponding to the spectrum of the infrared illuminator to produce a filtered light, which is received at the photoreceptor array. For example, at least a portion of the incoming light may be attenuated by at least 50%, at least 60%, at least 70%, at least 80%, or at least 90% by the bandpass filter. In another example, at least another portion of the incoming light may be transmitted with a transmission rate of at least 50%, at least 60%, at least 70%, at least 80%, or at least 90%. In at least one example, the band pass filter attenuates at least 95% of light with a wavelength greater than the infrared wavelength range emitted by the structured light source (i.e., for at least 100 nm greater than the infrared wavelength range emitted by the structured light source) and at least 95% of light with a wavelength less than the infrared wavelength range emitted by the structured light source (i.e., for at least 100 nm less than the infrared wavelength range emitted by the structured light source).

Figure 5:
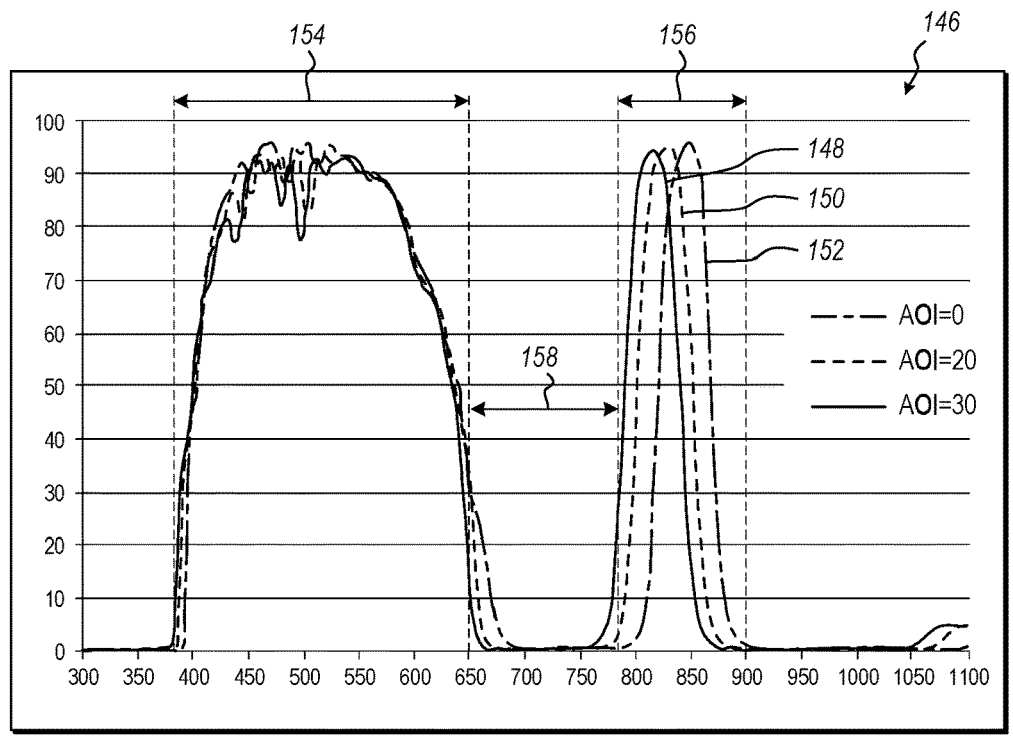
FIG. 5 illustrates embodiments of a transmission spectra of an embodiment of the bandpass filter of FIG. 1.

FIG. 5 is a chart 146 illustrating the transmission rate of an embodiment of a bandpass filter at different angles of incidence (AOI). The incoming light may approach the bandpass filter at a variety of AOI, and the 30° curve 148, the 20° curve 150, and the 0° curve 152 reflect the different transmission rates at the increasing AOIs. As the AOI increases, a curve of the transmission rate shifts toward shorter wavelengths. The effect of the AOI is most pronounced at longer wavelengths. For example, a portion of the 30° curve 148 in the visible wavelength range shifts less relative to the 0° curve 152 as compared to the shift between the infrared portion of the 30° curve 148 and the 0° curve 152. The passband is designed to match the infrared illuminator wavelength.

The bandpass filter may pass light in a transmitted visible wavelength range 154 and in a transmitted infrared wavelength range 156 while attenuating light in an attenuation wavelength range 158. Passing light in the transmitted visible wavelength range 154 allows the visible wavelength photoreceptors to receive and detect the visible light to create a visible light image of the object and/or environment within the field of view of the 3D imaging system. Passing light in the transmitted infrared wavelength range 156 allows the infrared wavelength photoreceptors to receive and detect the infrared light for 3D imaging and detecting depth of the object and/or environment within the field of view of the 3D imaging system. In some embodiments, attenuating light in the attenuation wavelength range 158 reduces interference from unintended wavelengths and enhances the reliability and precision of both the infrared wavelength 3D imaging and the reconstruction of visible light images.

In some embodiments, the transmitted visible light range 154 is between about 375 nm and 650 nm. In other embodiments, the transmitted visible wavelength range 154 is between about 400 nm and about 625 nm. In yet other embodiments, the transmitted visible wavelength range 154 is between about 425 nm and about 600 nm.

In some embodiments, the transmitted infrared wavelength range 156 is between about 750 nm and about 900 nm. In other embodiments, the transmitted infrared wavelength range 156 is between about 775 nm and about 875 nm. In yet other embodiments, the transmitted infrared wavelength range 156 is between about 775 nm and about 850 nm. In further embodiments, the transmitted infrared wavelength range 156 is between about 800 nm and about 830 nm. In at least one embodiment, the transmitted infrared wavelength range 156 is substantially equivalent to the emitted infrared wavelength range described in relation to FIG. 1.

In some embodiments, the attenuation wavelength range 158 is between about 600 nm and about 800 nm. In other embodiments, the attenuation wavelength range 158 is between about 625 nm and about 775 nm. In yet other embodiments, the attenuation wavelength range 158 is between about 650 nm and about 750 nm.

In some embodiments, the transmitted visible wavelength range 154, the transmitted infrared wavelength range 156, and the attenuation wavelength range 158 of the bandpass filter are at least partially related to the response curves of the photoreceptors in the hybrid imaging sensor. By way of example, response curves of different photoreceptors are depicted in FIG. 6.

Figure 6:
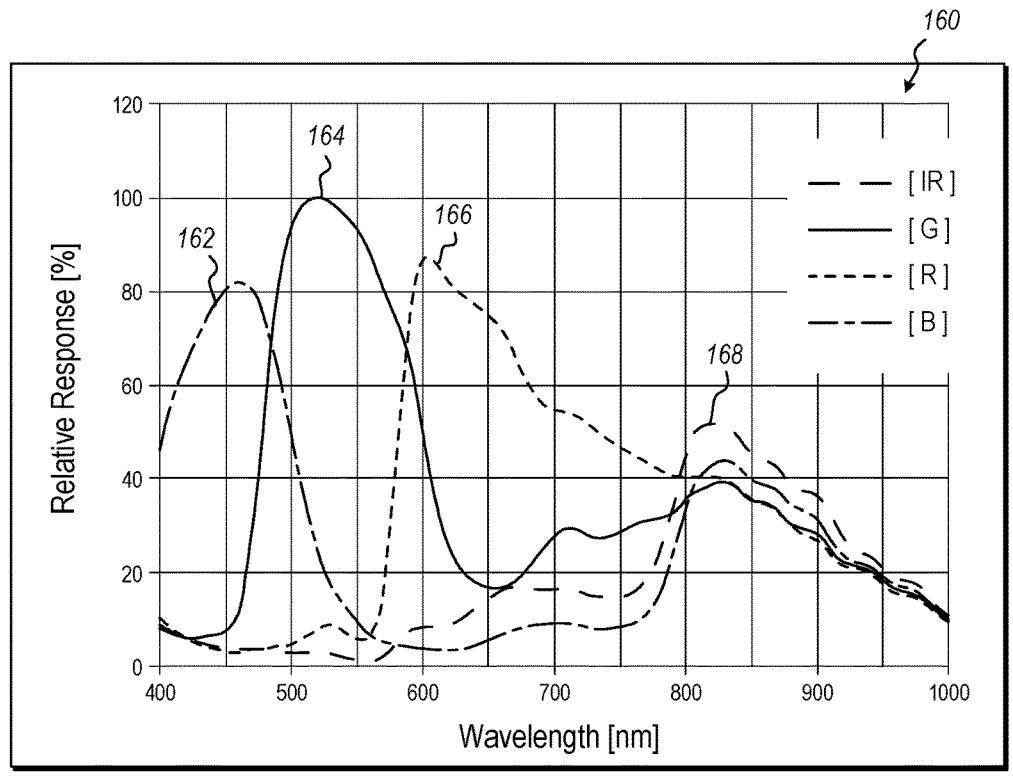
FIG. 6 illustrates embodiments of response curves of photoreceptors of the hybrid imaging sensor of FIG. 3A.

The graph 160 of FIG. 6 illustrates a blue light photoreceptor response curve 162, a green light photoreceptor response curve 164, a red light photoreceptor response curve 166, and an infrared photoreceptor response curve 168. For example, the blue light photoreceptor response curve 162 reflects a blue light photoreceptor being most sensitive to light at about 460 nm. The green light photoreceptor response curve 164 reflects a green light photoreceptor being most sensitive to light at about 520 nm. The red light photoreceptor response curve 166 may reflect a red light photoreceptor being most sensitive to light at about 600 nm. The infrared photoreceptor response curve 168 reflects an infrared wavelength photoreceptor being most sensitive to light at about 820 nm.

As shown in FIG. 6, all four of the response curves (blue light photoreceptor response curve 162, green light photoreceptor response curve 164, red light photoreceptor response curve 166, and infrared photoreceptor response curve 168) exhibit local increases in response rates between about 750 nm and about 900 nm. In some embodiments, the reduction of sensitivity to infrared light in one or more of the visible wavelength photoreceptors improves the efficiency of the imaging processes by at least reducing processing of infrared light by all of the photoreceptors.

Figures 7A, 7B:
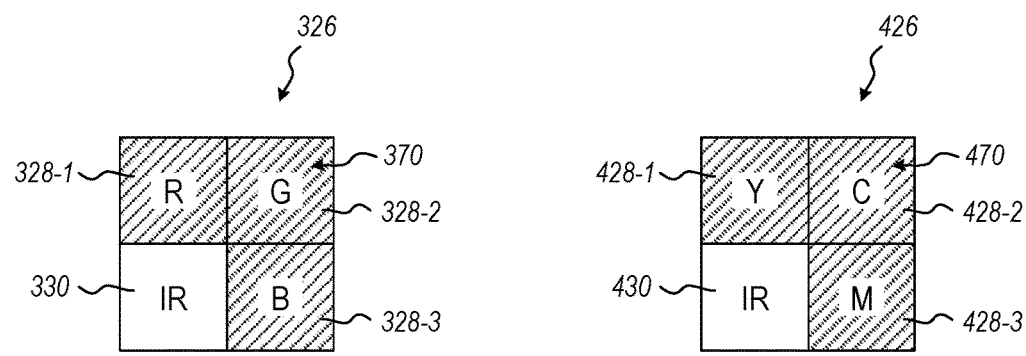
FIG. 7A is a schematic representation of an embodiment of the hybrid imaging sensor of FIG. 3A with a notch filter applied over a portion thereof corresponding to the infrared illuminator wavelength.
FIG. 7B is a schematic representation of another embodiment of the hybrid imaging sensor of FIG. 3B with a notch filter applied over a portion thereof.

FIG. 7A and FIG. 7B illustrate embodiments of a domain having a notch filter positioned on one or more of the visible wavelength photoreceptors and no notch filter on the infrared wavelength photoreceptor. For example, FIG. 7A illustrates an embodiment of a domain 326 having a notch filter 370 positioned in front of a first visible wavelength photoreceptor 328-1 configured to detect red light, a second visible wavelength photoreceptor 328-2 configured to detect green light, and a third visible wavelength photoreceptor 328-3 configured to detect blue light. The infrared wavelength photoreceptor 330 may not have a notch filter 370 positioned thereon to allow light in the infrared wavelength range to be received at the infrared wavelength photoreceptor 330.

FIG. 7B illustrates an embodiment of a domain 426 having a notch filter 470 positioned in front of a first visible wavelength photoreceptor 428-1 configured to detect red light, a second visible wavelength photoreceptor 428-2 configured to detect green light, and a third visible wavelength photoreceptor 428-3 configured to detect blue light. The infrared wavelength photoreceptor 430 may not have a notch filter 470 positioned thereon to allow light in the infrared wavelength range to be received at the infrared wavelength photoreceptor 430.

In some embodiments, the notch filter 370, 470 is used in conjunction with a bandpass filter as described herein to reduce cross-talk between the visible wavelength photoreceptors and the infrared wavelength photoreceptors. For example, the bandpass filter is configured to attenuate light in a relatively broader attenuation wavelength range described herein to the photoreceptor array, and the notch filter is configured to attenuate light in a relatively narrower range. A combination of the bandpass filter and a notch filter enable the passage of visible wavelength light to the visible wavelength photoreceptors and infrared wavelength light and visible wavelength light to the infrared wavelength photoreceptors.

Figure 8:
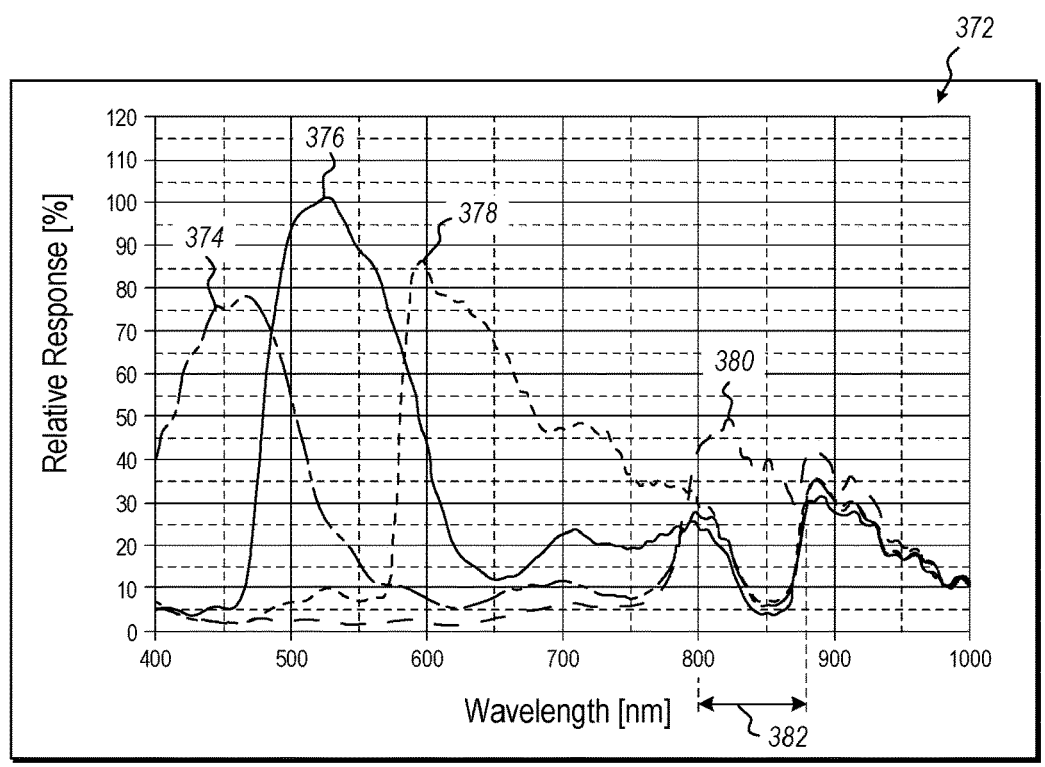
FIG. 8 illustrates embodiments of response curves of photoreceptors of the hybrid imaging sensor of FIG. 7A.

FIG. 8 is a chart 372 illustrating the response curves of the photoreceptors illustrated in FIG. 7A. For example, the blue light response curve 374, the green light response curve 376, and the red light response curve 378 each have peak sensitivities similar to those described in relation to FIG. 6. The infrared light response curve 380 of the infrared wavelength photoreceptor has a higher response than the blue light response curve 374, the green light response curve 376, and the red light response curve 378 in a notch filter range 382.

In some embodiments, the notch filter range 382 is between about 750 nm and 900 nm. In other embodiments, the notch filter range 382 is between about 775 nm and about 875 nm. In yet other embodiments, the notch filter range 382 is between about 775 nm and 850 nm. In further embodiments, the notch filter range 382 is between about 800 nm and about 830 nm. In at least one embodiment, the notch filter range 382 is equivalent to the emitted infrared wavelength range described in relation to FIG. 1. In some embodiments, the notch filter is configured to attenuate at least about 50%, about 60%, about 70%, about 80%, or about 90% of the light in the notch filter range 382.

Figure 9:
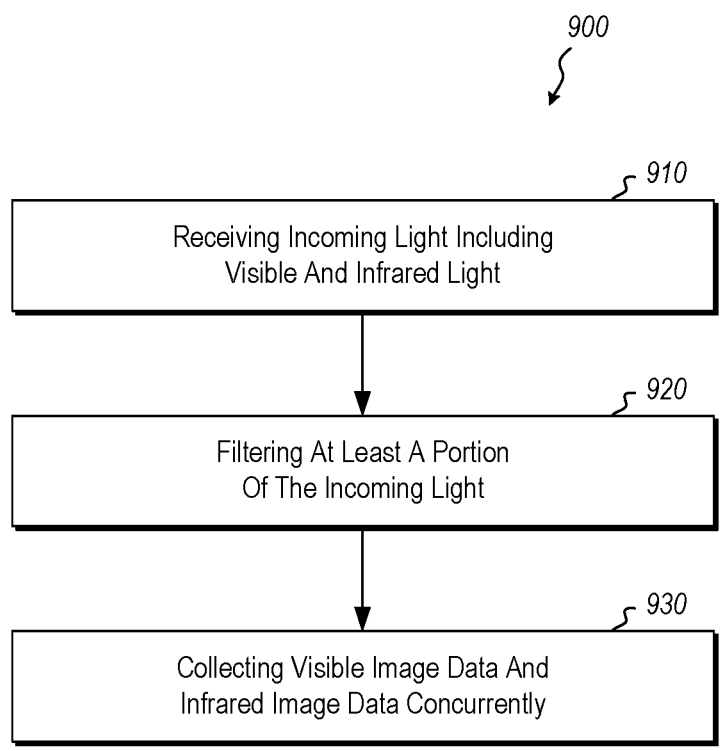
FIG. 9 is a flowchart illustrating a method of 3D imaging using an embodiment of a 3D imaging system as described herein.

FIG. 9 illustrates a flowchart 900 of a method of collecting image frames containing both visible wavelength image data and infrared wavelength image data for 3D imaging. The method includes an act 910 of receiving incoming light including visible and infrared light with a 3D imaging system. The incoming light may be a combination of ambient light and emitted light from a light source. A light source of the 3D imaging system emits infrared light, in some embodiments, in a structured light pattern. The infrared light may reflect off of an object and/or the surrounding environment and return toward the 3D imaging system. The incoming light may, therefore, include a mixture of the emitted infrared wavelength light and ambient light including visible wavelength length and infrared wavelength light.

The method also includes an act 920 of filtering at least a portion of the incoming light to produce a filtered light at a hybrid imaging sensor. Filtering the incoming light attenuates portions of the infrared spectrum which do not correspond to the illuminator spectrum. For example, filtering the incoming light attenuates portions of the spectrum that are not associated with a red portion of the visible wavelength range, a green portion of the visible wavelength range, a blue portion of the visible wavelength range, or an infrared wavelength range. In other examples, filtering the incoming light attenuates portions of the spectrum that are not associated with a yellow portion of the visible wavelength range, a cyan portion of the visible wavelength range, a magenta portion of the visible wavelength range, or an infrared wavelength range.

In some embodiments, filtering the incoming light may be accomplished by a bandpass filter with an attenuation range. The attenuation range may be located between the red portion of the visible wavelength range and the infrared emission wavelength range. In other embodiments, additional filtering the incoming infrared light may include attenuating a portion of the incoming light with one or more notch filters for the RGB pixels. The bandpass filter and notch filter may be used concurrently. Applying the notch filter (and other optical crosstalk mitigations) to the RGB pixels filters at least a portion of the incoming light from the RGB pixels and may reduce and/or eliminate cross-talk between RGB and IR photoreceptors in the hybrid imaging sensor.

The method 900 may also include an act 930 of collecting visible image data and infrared image data concurrently (such that at least some of the visible image data and some of the infrared image data are collected during the same imaging frame). The collection of the infrared and visible light data can also be substantially simultaneous (such that substantially all of the visible image data and all of the infrared image data are collected at the same time).

Collecting the visible image data with a single imaging lens occurs using a plurality of visible wavelength photoreceptors in the hybrid imaging sensor. The plurality of visible wavelength photoreceptors may include a plurality of domains that each include both visible wavelength photoreceptors and infrared wavelength photoreceptors, allowing concurrent and/or simultaneous collection of visible image data and infrared image data (i.e., without temporal displacement) which is aligned (i.e., without a perspective shift between the RGB and IR imaging system).

Typically the RGB and IR pixels have identical exposure and gain settings. In other examples the digital and analog gain for the IR pixels can be different than the digital and analog gain settings for the RGB pixels. In other examples, the exposure time for the RGB and IR pixels can be different. In some embodiments, the visible image data and the infrared image data are collected only partially concurrently. For example, only about 10% of the integration time of the visible image data and the infrared image data may overlap. In other examples, at least 30% of the integration time of the visible image data and the infrared image data overlaps. In yet other examples, at least 50% of the integration time of the visible image data and the infrared image data overlaps. For example, the integration time for the visible image data may be $\frac{1}{5}$ of a second, and the integration time for the infrared image data may be $\frac{2}{5}$ of a second. The integration time for the visible image data may therefore overlap for 50% of the integration time for the infrared image data. In at least one embodiment, the integration time of the visible image data and the infrared image data is simultaneous. In other words, the integration time for both the visible image data and the infrared image data begin and end at the same time, such that the integration time of both the visible image data and the infrared image data are 100% overlapping.

For a 1080p hybrid imaging sensor, such as described in relation to FIG. 4, the visible wavelength photoreceptors may provide visible image data that is approximately 1920× 1080 pixels, while the infrared wavelength photoreceptors may provide infrared image data that is approximately 960×540 pixels. In some embodiments, the infrared image data is upsampled to correspond to the resolution of the visible image data. The upsampling process may use information on other color channel as cues. In other embodiments, the visible image data is downscaled to the resolution of the infrared image data.

In at least one embodiment, the one or more processors described in relation to FIG. 1 are configured to receive visible image data from the visible wavelength photoreceptors and infrared image data from the infrared wavelength photoreceptors and to subsequently subtract at least a portion of the infrared image data from the visible image data and/or subtract at least a portion of the visible image data from the infrared image data.

A 3D imaging system with a hybrid imaging sensor as described herein may reduce and/or eliminate spatial and temporal displacement of infrared image data and visible image data. Spatially and temporally aligned infrared image data and visible image data may provide more accurate depth information and more accurate object identification in 3D imaging at increased frame rates.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein is combinable with any element of any other embodiment described herein, unless such features are described as, or by their nature are, mutually exclusive.

Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value. Where ranges are described in combination with a set of potential lower or upper values, each value may be used in an open-ended range (e.g., at least 50%, up to 50%), as a single value, or two values may be combined to define a range (e.g., between 50% and 75%).

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A system for three-dimensional imaging, the system comprising:
 a structured light source, the structured light source configured to emit an emitted light in a structured light pattern having a plurality of infrared dots, the emitted light being in an infrared wavelength range centered around a peak wavelength between about 750 nm and about 1000 nm;
 a hybrid imaging sensor having a plurality of domains, at least one domain of the plurality of domains including four photoreceptors,
  at least a first visible wavelength photoreceptor configured to detect ambient light in a visible wavelength range,
  at least a second visible wavelength photoreceptor configured to detect ambient light in the visible wavelength range, and
  at least one infrared wavelength photoreceptor configured to detect infrared light in the infrared wavelength range, the at least one infrared wavelength photoreceptor having an infrared wavelength photoreceptor width and the structured light pattern, a dot diameter of the imaged infrared dots at the hybrid imaging sensor is at least 3 times an infrared wavelength photoreceptor width, and wherein the hybrid imaging sensor is configured to detect a portion of the emitted light as a reflected light; and
 a bandpass filter configured to pass light in the visible wavelength range and in the infrared wavelength range and attenuate at least a portion of the light outside of the visible wavelength range and the infrared wavelength range.

2. The system of claim 1, the bandpass filter attenuating light both greater than and less than the infrared wavelength range.

3. The system of claim 1, the at least one visible wavelength photoreceptor comprising a plurality of visible wavelength photoreceptors, a first visible wavelength photoreceptor configured to detect red light, a second visible wavelength photoreceptor configured to detect blue light, and a third visible wavelength photoreceptor configured to detect green light.

4. The system of claim 1, the bandpass filter passing infrared light in a range no greater than 75 nm wide and centered on the peak wavelength of the structured light source.

5. The system of claim 1, the hybrid imaging sensor configured to detect infrared light data and visible light data concurrently.

6. The system of claim 1, the hybrid imaging sensor having a resolution of at least 640×480.

7. A system for three-dimensional imaging, the system comprising:
- a structured light source, the structured light source configured to emit a structured light in a structured light pattern having a plurality of infrared dots, the structured light being in an infrared wavelength range centered around a peak wavelength between about 750 nm and about 1000 nm;
- a hybrid imaging sensor having a plurality of domains, at least one domain of the plurality of domains including,
  - at least one first visible wavelength photoreceptor configured to detect ambient light in a visible wavelength range,
  - at least a second visible wavelength photoreceptor configured to detect ambient light in the visible wavelength range, and
  - at least one infrared wavelength photoreceptor configured to detect infrared light in the infrared wavelength range, the at least one infrared wavelength photoreceptor having an infrared wavelength photoreceptor width and the structured light pattern, a dot diameter of the imaged infrared dots at the hybrid imaging sensor is at least 3 times an infrared wavelength photoreceptor width, and wherein the hybrid imaging sensor is configured to detect a portion of the emitted light as a reflected light; and
- a bandpass filter configured to pass light in the visible wavelength range to the at least one visible wavelength photoreceptor and in the infrared wavelength range to the at least one infrared wavelength photoreceptor; and
- one or more processors in data communication with the hybrid imaging sensor.

8. The system of claim 7, the bandpass filter having a notch filter configured to attenuate light in the infrared wavelength range to the at least one visible wavelength photoreceptor.

9. The system of claim 8, the notch filter attenuates at least 50% of the light in the infrared wavelength range.

10. The system of claim 7, the hybrid imaging sensor configured to capture a frame including image data from the at least one visible wavelength photoreceptor and at least one infrared wavelength photoreceptor simultaneously.

11. The system of claim 7, the infrared wavelength photoreceptor being 25% or less of an active area of the domain.

12. The system of claim 7, the at least one visible wavelength photoreceptor configured to provide visible image data and the at least one infrared wavelength photoreceptor configured to provide infrared image data, and the one or more processors configured to subtract infrared image data from the visible image data.

13. The system of claim 7, the structured light source having a beam divergence that is at least three times an imaging system angular resolution.

14. A method of three dimensional imaging, the method comprising:
- providing a structured light in a structured light pattern with a structured light source, the structured light pattern having a plurality of infrared dots
- receiving incoming light with an imaging system, the incoming light including visible light and infrared light, at least a portion of the infrared light including reflected structured light, where the imaging system includes at least one infrared wavelength photoreceptor having an infrared wavelength photoreceptor width and the structured light pattern, a dot diameter of the imaged infrared dots at the hybrid imaging sensor is at least 3 times an infrared wavelength photoreceptor width;
- filtering the incoming light to attenuate light at least between 650 nm and 750 nm; and
- collecting visible image data regarding the visible light with at least one visible wavelength photoreceptor and infrared image data regarding the infrared light with at least one infrared wavelength photoreceptor concurrently.

15. The method of claim 14, further comprising emitting a structured light in an infrared wavelength range with a structured light source.

16. The method of claim 14, further comprising attenuating the infrared light with a notch filter applied to the at least one visible wavelength photoreceptor.

17. The method of claim 14, further comprising subtracting at least a portion of the infrared image data from the visible image data.

18. The method of claim 14, wherein collecting the visible image data and the infrared image data occurs simultaneously.

19. The method of claim 14, further comprising upsampling the infrared image data to a resolution of the visible image data.

* * * * *